3,801,502
WATERFLOOD BACTERIAL VISCOSIFIER
Donald O. Hitzman, Bartlesville, Okla., assignor to
Phillips Petroleum Company
No Drawing. Filed Sept. 23, 1971, Ser. No. 183,258
Int. Cl. E21b 43/20
U.S. Cl. 252—8.55 D                                    2 Claims

ABSTRACT OF THE DISCLOSURE

A method of treating fermentation products produced by the fermentation employing the genus Xanthomonas with alcohols, ketones, phenols, and nonionic surfactants to produce substances incorporable in water used in waterflooding to adjust the viscosity thereof.

---

This invention relates to the production of waterflood bacterial viscosifiers.

In one of its more specific aspects, this invention relates to the production of waterflood polymers from fermentation products.

Fermentation of carbohydrates for the production of heteropolysaccharides employing the genus Xanthomonas, including *Xanthomonas begoniae, Xanthomonas campestris,* and the like is well known. Relatedly, the use of such polysaccharide solutions or the products derived from their solutions as thickening agents for the preparation of viscous waterflooding solutions in secondary recovery operations is also well known, particularly their employment for increasing the viscosity of water. Generally, the fermentation product is employed as such, or is employed after clarification, and the amount of the fermentation product which is used depends to a considerable extent upon the viscosity of the product from the fermentor.

Such fermentor products would find wider use if there were developed methods of adjusting and, particularly, of increasing the viscosity of the fermentation product. This invention provides such methods.

According to this invention there is provided a method of producing waterflood bacterial viscosifiers which comprises introducing into an aqueous fermentation effluent produced by the bacterial action of the genus Xanthomonas a material selected from the group consisting of alcohols, phenols, ketones, and nonionic surfactants in an amount sufficient to increase the viscosity of the effluent to a desired level and recovering the viscosifier so produced.

The method of this invention applies to any polysaccharide solution or dispersion produced by the genus Xanthomonas. It is particularly effective when applied to polysaccharide solutions or dispersions produced by *Xanthomonas campestris,* NRRL B-1459, although others such as *Xanthomonas phaseoli, Xanthomonas malvacearum, Xanthomonas carotae, Xanthomonas translucens, Xanthomonas begoniae* and *Xanthomonas incanae* can be used.

The method of this invention is applicable to all microbial polysaccharide solutions or dispersions recovered from the fermentor or after separation of cells and solids therefrom. It is particularly applicable to solutions or dispersions having a Brookfield viscosity at 6 r.p.m. at room temperature, as measured on a Brookfield LVT viscometer equipped with UL adapter, of from about 6 to about 15 cp. and while the fermentation effluents of the examples set forth hereinafter have such viscosities, the method of this invention is not to be considered as being limited thereto.

In general, the method of this invention is applicable with alcohols, phenols, ketones, and nonionic surfactants.

Among the applicable alcohols, those preferred contain 1 to about 12 carbon atoms per molecule and can be straight-chained or branched, acyclic or cyclic. Examples of such alcohols include methanol, ethanol, 1-propanol, 2-propanol, 1-butanol, 2-methyl-2-propanol, 2-methyl-1-propanol, 1-hexanol, 2-octanol, 2-ethyl - 1 - hexanol, 3-decanol, 1-dodecanol, cyclohexanol, 2-methylcyclopentanol, cyclopentylmethanol, ethylene glycol, monoethyl ether of ethylene glycol, diethylene glycol, 1,4-butanediol, furfuryl alcohol, tetrahydrofurfuryl alcohol, and the like, and mixtures thereof. Polymeric polyols such as polyvinyl alcohol can be employed. In general, the method of this invention is applicable with all alcohols having sufficient solubility in water.

Among the applicable ketones, those preferred contain 3 to about 7 carbon atoms per molecule and can be straight-chained or branched, acyclic or cyclic. Examples of such ketones include acetone, methyl ethyl ketone, diethyl ketone, dipropyl ketone, diisopropyl ketone, cyclohexanone, 3-methylcyclopentanone, and the like, and mixtures thereof. In general, any ketone having substantial solubility in water can be employed.

Among the applicable phenols, those preferred contain about 6 to about 10 carbon atoms per molecule. Examples of such phenols include phenol, o-cresol, m-cresol, p-cresol, catechol, resorcinol, hydroquinone, 2-ethylphenol, 3-isopropylphenol, 4-butylphenol, 1-naphthol, 2-naphthol, and the like, and mixtures thereof.

Examples of nonionic surfactants include ethoxylated alcohols, e.g., polyoxyethylene lauryl, cetyl, stearyl, and oleyl ethers; ethoxylated alkylphenols, e.g., octyl- and monylphenoxypoly(ethyleneoxy)ethanol; ethoxylated amides, e.g., ethylene oxide condensates of fatty acid amides; ethoxylated fatty acids, e.g., ethylene oxide condensates of oleic, stearic, and coconut fatty acids and polyoxyethylene sorbitan stearates; alkanolamides, e.g., fatty alkylol amide condensates; glycerides, e.g., mono- and diglycerides of edible fats and oils; and the like. Such nonionic surfactants are commercially available. If desired, mixtures of surfactants can be employed.

The amount of the additives employed in this invention will vary in terms of the weight percent incorporated in the fermentor effluent from about 0.05 to about 5 weight percent, preferably from about 0.1 to about 1 weight percent, based on the weight of fermentor effluent or other aqueous solution or dispersion comprising the heteropolysaccharide.

The aforementioned materials can be introduced into the fermentor effluent in any convenient manner and the resulting mixture can then be maintained at any temperature between about 50° C. and its boiling point for a time sufficient to attain the desired viscosity. When mixtures of the above materials are employed, it may be desirable to add the first material at a first temperature and then the second material after raising the temperature of the previously treated effluent. Optimum values in viscosity increase are effected if the mixture is aged by maintaining at a temperature within the range of about 70° C. to about 100° C., e.g., 90° C., for a period of about 5 minutes to about 2 hours, e.g., 20–30 minutes, after addition of the aforementioned additives. Higher temperatures, e.g., up to 130° C. or higher, can be employed by maintaining the mixture under pressure.

If desired, microbial cells can be separated from the fermentor effluent prior to heating with the alcohols, ketones, phenols, and nonionic surfactants. Also, it is within the scope of this invention to evaporate the water from the fermentation effluent, with or without prior separation of microbial cells, dissolve or disperse the residue in water or brine, and heat the resulting solution or dispersion with an alcohol, ketone, phenol, or nonionic surfactant to increase the viscosity of the solution or dispersion.

The following examples will illustrate the use of the various materials employable in the method of this invention.

EXAMPLE I

The effluent from a fermentor containing cells and the heteropolysaccharides was treated in each of the following instances in the manner indicated.

In each instance the fermentor effluent was that resulting from a batch fermentation of 51 hours, using a *Xanthomonas campestris* culture. The effluent had a polymer concentration of 14.01 g./kg. of solution and a cell concentration of 3.92 g./kg. The fermentation medium consisted of 25 g./l. glucose, 4 g./l. $K_2HPO_4$, 1.5 g./l. $KH_2PO_4$, 0.2 g./l. $MgSO_4 \cdot 7H_2O$ and 4 g./l. amber BYF 100 with the glucose being sterilized separately. During fermentation, the pH was maintained at 6.8 with $NH_4OH$ and the temperature was maintained at 28° C. The fermentor effluent containing polymer, cells and a residual glucose concentration of 0.35 g./kg. was diluted with an equal volume of water to obtain the starting dispersion to which the agents listed below were added. Comparisons are made with comparable treatment in the absence of the viscosity-effecting additive. Brookfield viscosities are determined at 6 r.p.m., using a UL adapter, at room temperature.

| Additive | Additive, weight percent [1] | Temperature of treatment, °C. | Time of maintenance at temp., mins. | Viscosity, cp. |
|---|---|---|---|---|
| None | 0 | ([2]) | ([3]) | 6.0 |
| Do | 0 | 90 | 30 | 8.7 |
| Methanol | 0.5 | 90 | 30 | 13.5 |
| Ethanol | 0.1 | 90 | 30 | 14.4 |
| 1-propanol | 1.0 | 90 | 30 | 14.5 |
| 2-propanol | 0.5 | 90 | 30 | 13.5 |
| Methylethyl ketone | 0.5 | 90 | 30 | 11.5 |

[1] Based on weight of diluted effluent. [2] Room temperature. [3] As recovered.

The above data indicate the effectiveness of the agents concerned.

In all instances, the resulting composition was filterable or could be centrifuged and clarified with negligible loss in viscosity.

The compositions produced by the above procedures can be employed as such by adding to a waterflood media, or they can be evaporated to recover a dry product which can be redissolved in the waterflood medium to increase the viscosity of the latter.

EXAMPLE II

That fermentor effluent described in Example I was diluted with 1 part of water to 10 parts of effluent. To the resulting dispersion was added 0.5 weight percent phenol. The resulting composition was then maintained at a temperature of 90° C. for a period of 20 minutes. A comparison of the viscosity and filterability of the original diluted dispersion and the composition after treatment with phenol was as follows:

| | Original diluted dispersion | Phenol-treated dispersion |
|---|---|---|
| Viscosity, cp | 13.8 | 36.4 |
| Filterability, sec | 688 | 120 |

The filterability of the above samples was determined as that period of time required for passage of the solution through a 0.45μ filter after dilution with sea water to a viscosity of 8.5–8.7 cp. The viscosity was determined as in Example I.

Accordingly, the above data indicate that phenol simprove not only the viscosity of the saccharide solution but also its filterability.

EXAMPLE III

The following data illustrate the effect of adding various nonionic surfactants to fermentor effluent. In all instances, one of the following fermentation effluents was employed:

| Effluent No. | Duration of fermentation, hrs. | Viscosity, cp. [1] Unheated | Viscosity, cp. [1] After heating at 90°C. for 20 mins. | Cell free effluent, g./kg. | Cells, g./kg. | Polymer g./kg. |
|---|---|---|---|---|---|---|
| 10 | 52 | 12.5 | 23.5 | 18.24 | 4.64 | 11.41 |
| 12 | 64 | 9.9 | 18.9 | 18.74 | 4.74 | 12.61 |
| 14 | 78 | 11.0 | 29.0 | 24.14 | 2.59 | 17.99 |

[1] Determined at about 25° C., the fermentor effluent first having been diluted with an equal volume of water.

In all instances, the surfactant in the concentration indicated was added to the effluent, previously diluted with an equal volume of water, and the resulting composition was maintained at a temperature of about 90° C. for about 20 minutes. Viscosity measurements were as previously described with the original, diluted effluents having the viscosities indicated above, unheated and after being maintained at a temperature of 90° C. in the absence of surfactant addition.

| | Surfactant added | Concentration, wt. percent [1] | Viscosity, cp. |
|---|---|---|---|
| Effluent number: | | | |
| 10 | Atmos 150 | 1 | 27.5 |
| 10 | Ethofat 60/15 | 1 | 32 |
| 10 | Siponic E5 | 1 | 26 |
| 10 | Siponic E2 | 1 | 38.5 |
| 10 | do | 0.5 | 33.4 |
| 10 | do | 0.2 | 30.8 |
| 12 | Tween 60 | 1 | 23.8 |
| 12 | Igepal CO 530 | 1 | 20.5 |
| 12 | Triton X100 | 1 | 21.0 |
| 12 | Volpo 20 | 1 | 21.5 |
| 14 | Emcol H31A | 1 | 31 |
| 14 | Triton X405 | 0.5 | 36 |

[1] Based on weight of diluted effluent.

Atmos 150 is a glyceride of edible fats produced by Atlas Chemical Industries, Inc.

Ethofat is an ethylene oxide condensate of fatty acids produced by Armour Chemical Company.

Siponic E5 and E2 are ethoxylated tallow alcohols produced by Alcolac Chemical Corporation.

Tween 60 is a polyoxyethylene sorbitan monostearate produced by Atlas Chemical Industries, Inc.

Igepal CO 530 is nonylphenoxypoly(ethyleneoxy)ethanol produced by GAF Corporation, Dyestuff and Chemical Div.

Triton X100 and Triton X405 are octyl phenoxy polyethoxy ethanols produced by Rohm & Haas.

Volpo 20 is oleyl alcohol condensed with ethylene oxide produced by Croda, Inc.

Emcol H31A is polyethylene glycol monooleate produced by Witco Chemical Company.

On the basis of the above data it will be seen that nonionic surfactants are effective in modifying the fermentor effluents involved to produce waterflood bacterial viscosifiers.

In all of the above procedures, the effluent, upon the adjustment of its viscosity to the desired level, can be employed as such or can be evaporated to dryness and the solids recovered and used as a waterflood bacterial viscosifier.

The use of the polysaccharide biopolymers as herein concerned for oil recovery operations can produce solutions which are undesirably highly adsorbed by the reservoir surfaces. Such materials can be modified by heat and chemical treatment to decrease this adsorption. Simultaneously, there is imparted to the solution improved stability and filterability.

Preferably, this treatment is carried out with approximately one percent solutions. The treatment involves heating the solution, for example, for 20 minutes at 90° C., either as such or in the presence of about 0.5 volume percent of about a 37 percent solution of formaldehyde or in the presence of about 1 volume percent of phenol, or with other alcohols, phenols, aldehydes, ketones or surfactants containing an OH group. The water employed for the solutions should contain some minerals, such as are contained in undistilled water.

The data below illustrate this effect on the polymer as indicated by its viscosity before and after heat and chemical treatment and before and after adsorption on clay surfaces. In all instances a 1 percent biopolymer solution prepared in distilled water was diluted as indicated and its viscosity was determined as shown above. The diluent was used in an amount of 81 grams per 10 grams of 1 percent biopolymer solution.

| Diluent | Viscosity, cp., before and after clay adsorption | | | | | | | |
|---|---|---|---|---|---|---|---|---|
| | Untreated | | Heated | | 1% phenol [1] and heated | | 0.5% formaldehyde (37% soln.) [1] and heated | |
| | Before | After | Before | After | Before | After | Before | After |
| None | 79.8 | 37.4 | 80.3 | 40.2 | 83.6 | 43.1 | 86.9 | 44.3 |
| 500 p.p.m. NaCl | 29.1 | 18.0 | 56.5 | 37.9 | 59.4 | 40.5 | 60.3 | 39.3 |
| 5,000 p.p.m. brine | 33.0 | 14.0 | 69.1 | 36.9 | 69.2 | 44.1 | 68.5 | 43.0 |

[1] Based on weight of biopolymer solution.

A 1 percent biopolymer solution prepared with tap water and containing unidentified minerals as usually found therein was diluted as indicated below and its viscosity was determined as above. The diluent was used in an amount of 81 grams per 10 grams of 1-percent biopolymer solution.

| Diluent | Untreated | | Heated | | 1% phenol [1] and heated | | 0.5% formaldehyde (37% soln.) [1] and heated | |
|---|---|---|---|---|---|---|---|---|
| | Before | After | Before | After | Before | After | Before | After |
| None | 23.7 | 18.7 | 48.9 | 33.4 | 49.8 | 39.6 | 50.8 | 34.1 |
| 50,000 p.p.m. NaCl | 27.2 | 10.4 | 53.9 | 18.7 | 57.9 | 28.0 | 59.4 | 30.7 |

[1] Based on weight of biopolymer solution.

It will be seen from the foregoing that various modifications can be made to the method of this invention. Such modifications are considered, however, to be within the scope of the invention.

What is claimed is:

1. A method of treating a polysaccharide solution or a dispersion, fermentation product produced by the action of bacteria of the genus Xanthomonas on a carbohydrate nutrient to produce waterflood bacterial viscosifiers which comprises introducing into said fermentation product from about 0.05 to about 5 weight percent of at least one additive selected from the group consisting of phenols containing from about 6 to about 10 carbon atoms per molecule and nonionic surfactants said surfactants selected from the group consisting of ethoxylated alcohols, ethoxylated alkyl phenols, ethoxylated amides, ethoxylated fatty acids, alkanolamides and glycerides to produce a mixture, maintaining the mixture at a temperature in the range of 50° C. to the boiling point of the mixture and for a time in the range of 5 minutes to 2 hours sufficient to increase the viscosity of said mixture and recovering said viscous mixture as a viscosifier.

2. The method of claim 1 in which at least two additives are introduced into said product, said additives being introduced individually and the resulting mixture being maintained at product temperatures successively raised to produce increased viscosity of the mixture.

References Cited
UNITED STATES PATENTS

| 3,633,689 | 1/1972 | Christman | 252—8.5 X |
| 3,578,499 | 5/1971 | Crotty et al. | 134—4 |
| 3,618,664 | 11/1971 | Harvey | 252—8.55 X |
| 3,305,016 | 2/1967 | Lindblom et al. | 252—8.5 X |
| 3,232,929 | 2/1966 | McNeely et al. | 252—8.5 X |

HERBERT B. GUYNN, Primary Examiner

U.S. Cl. X.R.

166—275; 252—316